(12) United States Patent
Hu et al.

(10) Patent No.: US 10,705,270 B2
(45) Date of Patent: Jul. 7, 2020

(54) DISPLAY PANEL AND DISPLAY DEVICE

(71) Applicant: BOE TECHNOLOGY GROUP CO., LTD., Beijing (CN)

(72) Inventors: Yong Hu, Beijing (CN); Xinyin Wu, Beijing (CN); Xueguang Hao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 68 days.

(21) Appl. No.: 15/527,818

(22) PCT Filed: May 19, 2016

(86) PCT No.: PCT/CN2016/082607
§ 371 (c)(1),
(2) Date: May 18, 2017

(87) PCT Pub. No.: WO2017/152498
PCT Pub. Date: Sep. 14, 2017

(65) Prior Publication Data
US 2018/0107051 A1    Apr. 19, 2018

(30) Foreign Application Priority Data

Mar. 11, 2016    (CN) .................... 2016 2 0189875 U (51) Int. Cl.
*G02B 5/20*    (2006.01)
*G02F 1/1335*    (2006.01)
(Continued)

(52) U.S. Cl.
CPC .............. *G02B 5/201* (2013.01); *G02B 5/20* (2013.01); *G02B 5/203* (2013.01); *G02F 1/1337* (2013.01);
(Continued)

(58) Field of Classification Search
CPC .......... G02B 5/20; G02B 5/201; G02B 5/203; G02B 5/26; G02B 5/206
See application file for complete search history.

(56) References Cited

U.S. PATENT DOCUMENTS

2002/0113936 A1    8/2002    Yanagawa et al.
2011/0222016 A1    9/2011    Kaneko et al.
2016/0266443 A1    9/2016    Pang et al.

FOREIGN PATENT DOCUMENTS

CN    101211069 A    7/2008
CN    102193253 A    9/2011
(Continued)

OTHER PUBLICATIONS

Search Report for t for International Application No. PCT/CN2016/082607 dated Dec. 22, 2016.

*Primary Examiner* — Darryl J Collins
*Assistant Examiner* — Journey F Sumlar
(74) *Attorney, Agent, or Firm* — Calfee, Halter & Griswold LLP

(57) ABSTRACT

A display panel and a display are provided. The display panel includes a first base-plate and a second base-plate which are oppositely disposed. The first base-plate includes a black matrix and a first spacer. The black matrix has a first black matrix area corresponding to the first spacer. The first base-plate or the second base-plate includes a first light shielding pattern. The projection of at least a part of the first light shielding pattern on the first base-plate is located on at least one of two sides of the projection of the first black matrix area on the first base-plate along a rub alignment direction.

19 Claims, 5 Drawing Sheets

(a)

(b)

(51) Int. Cl.
*G02F 1/1337* (2006.01)
*G02F 1/1339* (2006.01)

(52) U.S. Cl.
CPC .... *G02F 1/13394* (2013.01); *G02F 1/133514* (2013.01); *G02F 2001/13396* (2013.01)

(56) References Cited

FOREIGN PATENT DOCUMENTS

| | | |
|---|---|---|
| CN | 104216163 A | 12/2014 |
| CN | 104656318 A | 5/2015 |
| JP | 2010039332 A | 2/2010 |

DISPLAY PANEL AND DISPLAY DEVICE

RELATED APPLICATIONS

The present application is the U.S. national phase entry of PCT/CN2016/082607, with an international filing date of May 19, 2016, which claims the benefit of Chinese Patent Application No. 201620189875.5 filed on Mar. 11, 2016, the entire disclosures of which are incorporated herein by reference.

TECHNICAL FIELD

The disclosure relates to the field of display technology, and in particular, to a display panel and a display device.

BACKGROUND

A liquid crystal display panel consists of a color film base-plate and an array base-plate which assemble each other and a liquid crystal layer located between the two. The uniformity of the box thickness of the liquid crystal display panel is an important technical index measuring the quality of a liquid crystal display. To maintain the uniformity of the box thickness, currently, the most widely used method is to dispose post spacers (PS for short) between the color film base-plate and the array base-plate to support the two base-plates. In general, the spacers are formed on a black matrix of the color film base-plate by exposure. In addition, since liquid crystal molecules need to achieve a certain arrangement orientation by an alignment layer, an alignment layer in contact with the liquid crystal layer is further disposed on the surfaces of the color film base-plate and the array base-plate. The surface of the alignment layer needs to undergo rub by a rub roller, to form grooves arranged in a certain direction on the surface of the alignment layer, thereby causing the liquid crystal molecules to generate an orientation in a certain direction.

SUMMARY

In an aspect, an embodiment of the disclosure provides a display panel comprising a first base-plate and a second base-plate which are oppositely disposed, the first base-plate comprising a black matrix and a first spacer, the black matrix having a first black matrix area corresponding to the first spacer, wherein the first base-plate and alternatively the second base-plate further comprises a first light shielding pattern, and the projection of at least a part of the first light shielding pattern on the first base-plate is located on at least one of two sides of the projection of the first black matrix area on the first base-plate along a rub alignment direction.

In certain exemplary embodiments, the first base-plate further comprises a second spacer, and the height from the bottom surface of the first spacer away from the first base-plate to a substrate base-plate of the first base-plate is greater than the height from the bottom surface of the second spacer away from the first base-plate to the substrate base-plate of the first base-plate, the black matrix further has a second black matrix area corresponding to the second spacer, the first base-plate and alternatively the second base-plate further comprises a second light shielding pattern, and the projection of the second light shielding pattern on the first base-plate is located on at least one of two sides of the projection of the second black matrix area on the first base-plate along the rub alignment direction.

In certain exemplary embodiments, the first black matrix area and the first light shielding pattern on two sides of it along the rub alignment direction constitute a first light shielding area, the second black matrix area and the second light shielding pattern on two sides of it along the rub alignment direction constitute a second light shielding area, and along the rub alignment direction, the length of the projection of the first light shielding area on the first base-plate is greater than that of the projection of the second light shielding area on the first base-plate, or, the first black matrix area and the first light shielding pattern on one of two sides of it along the rub alignment direction constitute a first light shielding area, the second black matrix area and the second light shielding pattern on one of two sides of it along the rub alignment direction constitute a second light shielding area, and along the rub alignment direction, the length of the projection of the first light shielding area on the first base-plate is greater than that of the projection of the second light shielding area on the first base-plate.

In certain exemplary embodiments, the first light shielding pattern has a first width along the direction perpendicular to the rub alignment direction, and the first width of at least a part of the area of the first light shielding pattern decreases along a direction away from the first spacer.

In certain exemplary embodiments, the first light shielding pattern has a first width along the direction perpendicular to the rub alignment direction, and the width is greater than and alternatively equal to the width of the first spacer along the rub alignment direction.

In certain exemplary embodiments, the second light shielding pattern has a second width along the direction perpendicular to the rub alignment direction, and the second width of at least a part of the area of the second light shielding pattern decreases along a direction away from the second spacer.

In certain exemplary embodiments, the second light shielding pattern has a second width along the direction perpendicular to the rub alignment direction, and the second width is greater than and alternatively equal to the width of the second spacer along the rub alignment direction.

Optionally, the first light shielding pattern is constituted by a first black matrix pattern disposed on the same layer as the black matrix.

In certain exemplary embodiments, the first black matrix pattern is an extension of the first black matrix area.

In certain exemplary embodiments, the second light shielding pattern is constituted by a second black matrix pattern disposed on the same layer as the black matrix.

In certain exemplary embodiments, the second black matrix pattern is an extension of the second black matrix area.

Optionally, the first light shielding pattern is constituted by a metal pattern disposed on the second base-plate.

In certain exemplary embodiments, the second light shielding pattern is constituted by a metal pattern disposed on the second base-plate.

Optionally, the first base-plate further comprises a plurality of color filter units arranged in an array, and a filter layer is disposed in each of the color filter units, and the first light shielding pattern is formed by superposing two neighboring said filter layers.

In certain exemplary embodiments, the first base-plate further comprises a plurality of color filter units arranged in an array, and a filter layer is disposed in each of the color filter units, and the second light shielding pattern is formed by superposing two neighboring said filter layers.

In certain exemplary embodiments, the first base-plate further comprises a cushion layer, the first spacer is disposed above the cushion layer, and the height of the body of the first spacer is identical to that of the body of the second spacer.

In another aspect, an embodiment of the disclosure provides a display device comprising a display panel as described in any of the preceding items.

Base on this, in the above described display panel provided by the embodiments of the disclosure, the first base-plate and alternatively the second base-plate comprises the first light shielding pattern located on at least one of two sides of the projection of the first black matrix area on the first base-plate along the rub alignment direction, and the first light shielding pattern may shield at least a part of the rub alignment shadow of the first spacer on the alignment layer, which results in that the rub alignment shadow generated on the alignment layer due to the existence of the first spacer will not fall and alternatively less falls within the effective display area.

BRIEF DESCRIPTION OF THE DRAWINGS

In order to more clearly illustrate the technical solutions in embodiments of the disclosure or the prior art, the appended drawings needing to be used in the description of the embodiments or the prior art will be introduced briefly in the following. Obviously, the drawings in the following description are only some embodiments of the disclosure, and for those of ordinary skills in the art, other drawings may also be obtained according to these drawings under the premise of not paying out creative work.

REFERENCE SIGNS

01 Display panel
10 First base-plate
100 Substrate base-plate
20 Second base-plate
30 Black matrix
31 First black matrix area
32 Second black matrix area
40 Alignment layer
50 Spacer
51 First spacer
52 Second spacer
61 First light shielding pattern
62 Second light shielding pattern
70 Filter layer
70a Cushion layer
80 Metal pattern
90 TFT (Thin Film Transistor)
02 Rub roller
G Gate line
D Data line

DETAILED DESCRIPTION

In the following the technical solutions in embodiments of the disclosure will be described clearly and completely in conjunction with the drawings in the embodiments of the disclosure. Obviously, the described embodiments are just a part of the embodiments of the disclosure, and not all of the embodiments. Based on the embodiments in the disclosure, all the other embodiments obtained by those of ordinary skills in the art under the premise of not paying out creative work pertain to the scope protected by the disclosure.

It needs to be noted that, unless defined otherwise, all of the terminologies (including technical and scientific terminologies) used in the embodiments of the disclosure have the same meaning as commonly understood by those of ordinary skills in the art that the disclosure pertains to. It will be further appreciated that terms such as defined in a general dictionary should be construed as having meaning consistent with the meaning thereof in the context of the related art, but should not be explained in idealized and alternatively extremely formalized meaning, unless they are so defined explicitly.

Moreover, since the sizes of individual structures involved in the embodiments of the disclosure are very small, for the sake of clarity, the sizes of individual structures in the drawings of the embodiments of the disclosure are all enlarged, and unless indicated explicitly, they do not represent actual sizes and proportions.

Figure 1:
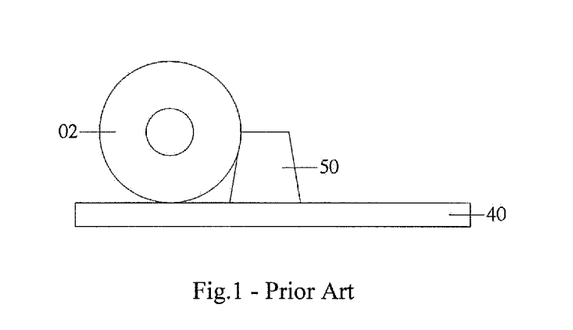
FIG. 1 is a schematic diagram of rub orientation conducted by a rub roller on a surface of an alignment layer in the prior art.
Figure 2:
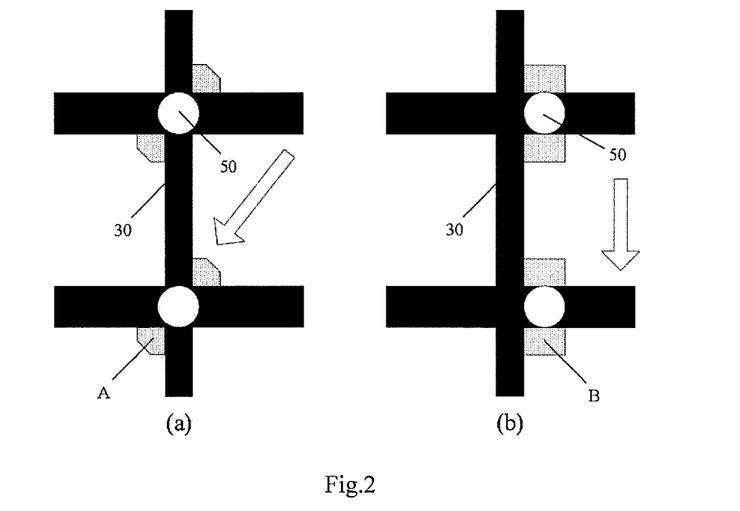
FIG. 2 is a schematic diagram of two modes in which a rub alignment shadow is generated on the surface of the alignment layer due to the existence of a spacer in FIG. 1.

As shown in FIG. 1 and FIG. 2, during rub orientation for the alignment layer 40, since a spacer 50 has a certain height, it is difficult for the rub roller 02 to reach two sides of the bottom of the spacer 50 along a direction of the rub orientation (as shown by an arrow direction in FIG. 2), which results in that at this location the surface of the alignment layer 40 is not subject to rub or the rub is not sufficient. Such an area where the surface of the alignment layer is not subject to rub or the rub is not sufficient due to the existence of a spacer is generally called a rub alignment shadow.

As shown in (a) of FIG. 2, when a spacer 50 is located at the intersection of a horizontal portion and a vertical portion of the black matrix 30, a rub alignment shadow (marked as A in the figure) will extend into an effective display area outside of black matrix 30 if the direction of the rub orientation tilts with respect to the horizontal and vertical portions of the black matrix 30. Since a rub anomaly occurs to the alignment layer in this area, it results in that a light leakage phenomenon appears in this area, which is manifested as a bright region occurring to an originally dark state and affects the display contrast.

As shown in (b) of FIG. 2, when a spacer 50 is located at a horizontal or vertical portion of the black matrix 30, a rub alignment shadow (marked as B in the figure) will also extend into an effective display area outside of black matrix if the direction of the rub orientation is perpendicular to the portion of the black matrix 30 where the spacer 50 is located, which results in that a light leakage phenomenon appears in this area, and affects the display contrast.

Figure 3:
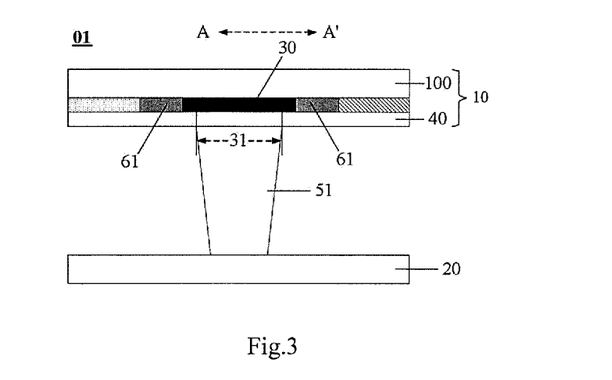
FIG. 3 is a first partial cross-sectional structure diagram of a display panel provided by an embodiment of the disclosure.
Figure 4:
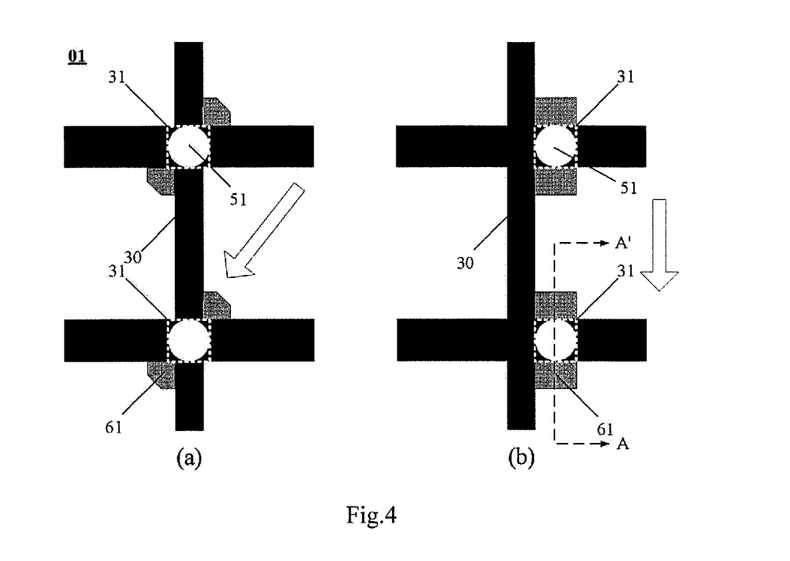
FIG. 4 is a first partial schematic structural top view of a display panel provided by an embodiment of the disclosure.

As shown in FIG. 3 and FIG. 4, an embodiment of the disclosure provides a display panel 01 comprising a first base-plate 10 and a second base-plate 20 which are oppositely disposed, the first base-plate 10 comprising a black matrix 30, an alignment layer 40 and a first spacer 51, the black matrix 30 having a first black matrix area 31 corresponding to the first spacer 51, wherein the first base-plate 10 (which is not schematically shown in FIG. 4) and alternatively the second base-plate 20 (which is not schematically shown in FIG. 4) further comprises a first light shielding pattern 61, and the projection of at least a part of the first light shielding pattern 61 on the first base-plate 10 is located on at least one of two sides of the projection of the first black matrix area 31 on the first base-plate 10 along a rub alignment direction, and used for shielding at least a part of the rub alignment shadow of the first spacer 51 on the alignment layer 40.

It needs to be noted that, firstly, the first base-plate 10 may in particular be a color film base-plate, and the second base-plate 20 is just an array base-plate which assembles the color film base-plate, and alternatively the first base-plate 10 may in particular be a black matrix base-plate, usually called a BM (black matrix) base-plate, and the second base-plate 20 is just a COA (color filter on array) base-plate, i.e., a base-plate in which a thin film transistor array layer and a color filter layer are integrated, which assembles the BM base-plate.

Secondly, in the embodiment of the disclosure, the above mentioned "two sides . . . along a rub alignment direction" means that the projection of the first light shielding pattern 61 on the first base-plate 10 is located on two opposite sides of the projection of the first black matrix area 31 on the first base-plate 10 and located on the extension line of the projection of the first black matrix area 31 on the first base-plate 10 along the rub alignment direction. Here, according to the deviation range actually allowed by the production of the display panel 01, the first light shielding pattern 61 may be located in a direction within a range of a certain angle (<30°) with the extension line of the projection of the first black matrix area 31 on the first base-plate 10 along the rub alignment direction.

Thirdly, the relative position of the alignment layer 40 in the first base-plate 10 and the first spacer 51 may be for example such that the first spacer 51 is disposed on a surface of the alignment layer 40 as shown in FIG. 3, and alternatively also may be such that the alignment layer 40 covers the first spacer 51, which may specifically follow the prior art, and will not be defined specifically by the embodiments of the disclosure.

The pattern of the black matrix 30 in the first base-plate 10 may specifically follow the pattern of the black matrix on the color film base-plate and alternatively the BM base-plate, which will not be defined specifically by the embodiments of the disclosure.

The first black matrix area 31 on the black matrix 30 corresponding to the first spacer 51 is used for shielding the first spacer 51 in a direction perpendicular to the surface of the display panel 01.

Fourthly, the first light shielding pattern 61 may specifically be implemented by an opaque pattern disposed on the first base-plate 10 and alternatively the second base-plate 20 corresponding to two sides of the projection of the first black matrix area 31 on the first base-plate 10 along the rub alignment direction, and FIG. 3 is just an example. The shape of its area may be a rectangle, a circle, an irregular figure, etc. Moreover, the projection of the first light shielding pattern 61 on the first base-plate 10 may and alternatively may not adjoin the projection of the first black matrix area 31 on the first base-plate 10, as long as the first light shielding pattern 61 may shield at least a part of the rub alignment shadow of the first spacer 51 on the alignment layer 40.

Exemplarily, as shown in (a) of FIG. 4, when the first spacer 51 is located at the intersection of a horizontal portion and a vertical portion of the black matrix 30 and the direction of the rub orientation is tilted, the first light shielding pattern 61 is located on the front and rear sides of the first black matrix area 31 of the black matrix 30 corresponding to the first spacer 51 along the tilted rub alignment direction.

As shown in (b) of FIG. 4, when the spacer (first spacer 51) is located at a horizontal and alternatively vertical portion (in the figure, only horizontal is taken as an example) of the black matrix 30, the first light shielding pattern 61 is located on the upper and lower sides of the first black matrix area 31 of the black matrix 30 corresponding to the first spacer 51 along the vertical rub alignment direction if the direction of the rub orientation is vertical which is perpendicular to the horizontal portion.

Based on this, in the above described display panel 01 provided by the embodiments of the disclosure, the first base-plate 10 and alternatively the second base-plate 20 comprises the first light shielding pattern 61 located on at least one of two sides of the projection of the first black matrix area 31 on the first base-plate 10 along the rub alignment direction, and the first light shielding pattern 61 may shield at least a part of the rub alignment shadow of the first spacer 51 on the alignment layer 40, which results in that the rub alignment shadow generated on the alignment layer due to the existence of the first spacer 51 will not fall and alternatively less falls within the effective display area, reduces the light leakage problem of the alignment layer due to the existence of the spacer, avoids and alternatively reduces the display defect that a bright area appears in a dark state due to the light leakage, ensures that the display panel 01 has a good display contrast, and improves the display quality.

Figure 5A:
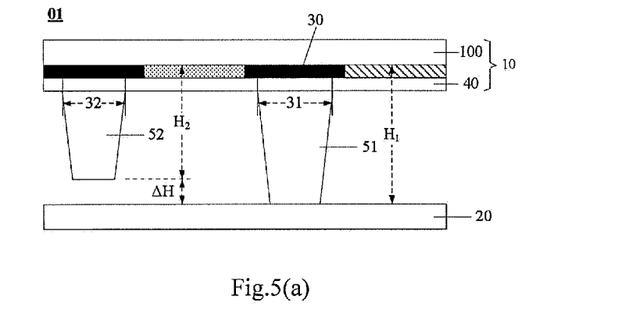
FIG. 5(a) is a second partial cross-sectional structure diagram of a display panel provided by an embodiment of the disclosure.
Figure 5B:
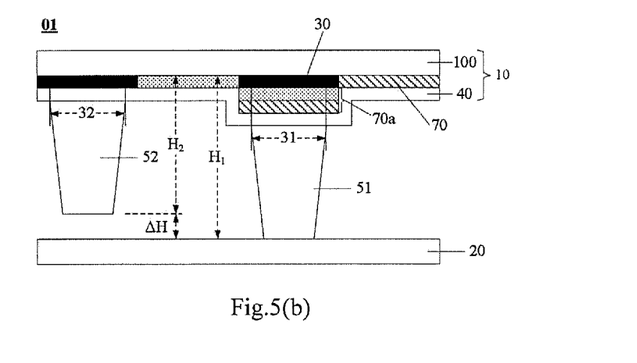
FIG. 5(b) is a third partial cross-sectional structure diagram of a display panel provided by an embodiment of the disclosure.
Figure 6:
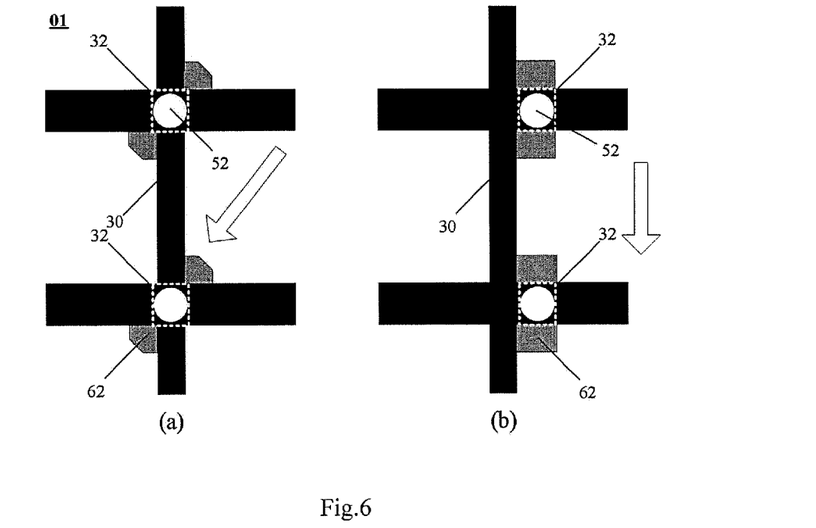
FIG. 6 is a second partial schematic structural top view of a display panel provided by an embodiment of the disclosure.

Based on the above description, as shown in FIG. 5($a$) and FIG. 5($b$), the first base-plate 10 further comprises a second spacer 52, and the height (which is marked as $H_1$ in the figure) from the bottom surface of the first spacer 51 away from the first base-plate 10 to a substrate base-plate 100 of the first base-plate 10 is greater than the height (which is marked as $H_2$ in the figure) from the bottom surface of the second spacer 52 away from the first base-plate 10 to the substrate base-plate 100 of the first base-plate 10, as shown in FIG. 6, the black matrix 30 further has a second black matrix area 32 corresponding to the second spacer 52, the first base-plate 10 and alternatively the second base-plate 20 further comprises a second light shielding pattern 62, and the projection of the second light shielding pattern 62 on the first base-plate 10 is located on at least one of two sides of the projection of the second black matrix area 32 on the first base-plate 10 along the rub alignment direction, and is used for shielding at least a part of the rub alignment shadow of the second spacer 52 on the alignment layer 40.

It needs to be noted that, in the prior art, the spacer disposed on the color film base-plate and alternatively the BM base-plate generally consists of a main spacer and an auxiliary spacer, wherein the height of the auxiliary spacer is less than that of the main spacer, and when the liquid crystal display panel after assembly is subject to a large pressure, the difference in height (ΔH) between the main spacer and the auxiliary spacer may provide a certain margin of compression to the liquid crystal display panel, such that the auxiliary spacer and the main spacer bear the pressure together, thereby causing the liquid crystal layer to maintain a certain thickness and avoiding that excessive deformation affects the normal display.

Therefore, the above mentioned first spacer 51 in the embodiments of the disclosure may also be called the main spacer, and the second spacer 52 may also be called the auxiliary spacer. Specific positions where the first spacer 51 and the second spacer 52 are disposed on the black matrix 30 may follow the prior art, which will not be defined specifically by the embodiments of the disclosure.

Moreover, the section sizes of the first spacer 51 and the second spacer 52 may be the same, and alternatively also may be different, and the embodiments of the disclosure will be described exemplarily taking that the section of the first spacer 51 is larger than that of the second spacer 52 as an example.

Here, the difference in height (ΔH) between the first spacer 51 and the second spacer 52 may be generally realized in the following two modes.

Mode One

With reference to FIG. 5(a), the height of the body of the first spacer 51 (i.e., the length size of the first spacer 51 itself along a direction perpendicular to the surface of the display panel) is greater than the height of the body of the second spacer 52 (i.e., the length size of the second spacer 52 itself along the direction perpendicular to the surface of the display panel). As such, when both are disposed on the black matrix 30 and alternatively the alignment layer 40 of the same height and the first spacer 51 contacts the second base-plate 20, there is a certain difference in height (ΔH) between the second spacer 52 and the second base-plate 20, which therefore provides the liquid crystal display panel after assembly with a certain margin of compression.

Mode Two

The first base-plate 10 further comprises a cushion layer, the first spacer 51 is disposed above the cushion layer 70a, and the height of the body of the first spacer 51 is identical to that of the body of the second spacer 52.

It needs to be noted that, firstly, when describing that the first spacer 51 is disposed above the cushion layer in the embodiments of the disclosure, "above" herein is defined in order of production. That is to say, in the first base-plate 10, the cushion layer is formed first and then the first spacer 51 is formed, and thus the first spacer 51 is disposed above the cushion layer.

Secondly, the cushion layer may specifically be formed by superposing filter layers and alternatively consist of other film layer. Taking that the cushion layer is specifically formed by superposing filter layers as an example, with reference to FIG. 5(b), the first base-plate 10 further comprises a plurality of color filter units defined by the black matrix 30, a filter layer 70 is disposed in each of the color filter units, and the portions of the filter layers 70 in two neighboring color filter units extending to the black matrix 30 are superposed to form the cushion layer 70a.

Here, since the heights of the first spacer 51 and the second spacer 52 themselves are the same, but the first spacer 51 is disposed above the cushion layer 70a, that is, the height $H_1$ of the first spacer 51 comprises the thickness of the substrate base-plate 100, the thickness of the black matrix 30, the thickness of the alignment layer 40, the thickness of the cushion layer 70a and the height of the first spacer 51 itself, whereas the height $H_2$ of the second spacer 52 comprises the thickness of the substrate base-plate 100, the thickness of the black matrix 30, the thickness of the alignment layer 40, and the height of the first spacer 51 itself, there is the thickness of the cushion layer 70a between the two, namely, the difference in height ΔH.

The height ΔH of the cushion layer 70a formed by superposing two neighboring filter layers 70 is substantially identical to the difference in height required between the main spacer and the auxiliary spacer in the prior art, and therefore the difference in height between the two spacers is implemented by employing the above described mode in which the first spacer 51 is disposed above the cushion layer 70a.

Based on the above description, considering that the height of the first spacer 51 is greater than that of the second spacer 52, and that the abnormal area of the former along the rub direction will also be longer than that of the latter, optionally, the heights of the first spacer 51 and the second spacer 52 and the lengths of their corresponding total light shielding areas along the rub alignment direction also take on a certain proportion relationship.

That is, when the first light shielding pattern 61 is disposed on two sides of the first black matrix area 31 along the rub alignment direction, and meanwhile, the second light shielding pattern 62 is also disposed on two sides of the second black matrix area 32 along the rub alignment direction, the first black matrix area 31 and the first light shielding pattern 61 on two sides of it along the rub alignment direction constitute a first light shielding area, the second black matrix area 32 and the second light shielding pattern 62 on two sides of it along the rub alignment direction constitute a second light shielding area, and along the rub alignment direction, the length of the projection of the first light shielding area on the first base-plate 10 is greater than that of the projection of the second light shielding area on the first base-plate 10.

When the first light shielding pattern 61 is only disposed on one of two sides of the first black matrix area 31 along the rub alignment direction, and meanwhile, the second light shielding pattern 62 is also only disposed on one of two sides of the second black matrix area 32 along the rub alignment direction, the first black matrix area 31 and the first light shielding pattern 61 on the one of two sides of it along the rub alignment direction constitute a first light shielding area, the second black matrix area 32 and the second light shielding pattern 62 on the one of two sides of it along the rub alignment direction constitute a second light shielding area, and along the rub alignment direction, the length of the projection of the first light shielding area on the first base-plate 10 is greater than that of the projection of the second light shielding area on the first base-plate 10.

Figure 7:
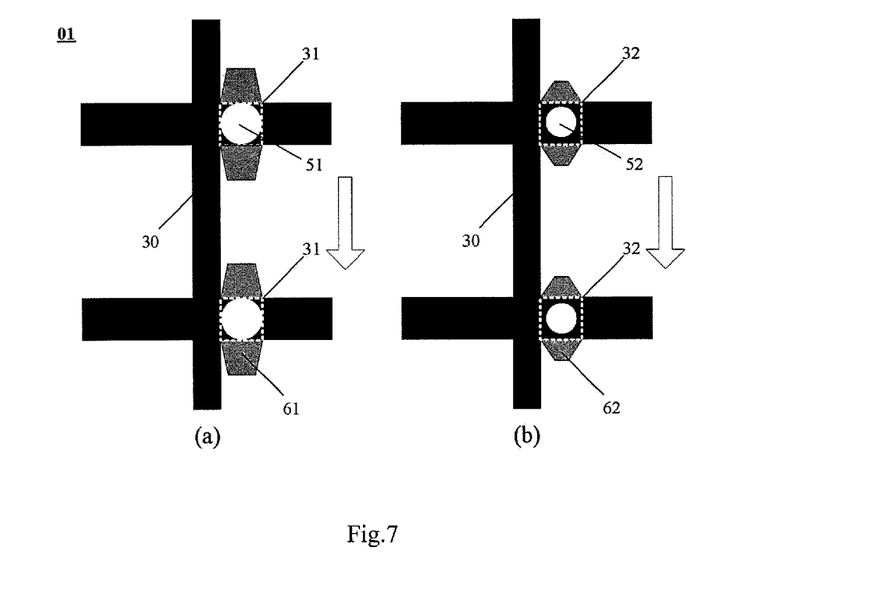
FIG. 7 is a third partial schematic structural top view of a display panel provided by an embodiment of the disclosure.

Based on this, optionally, considering that the cross sections of the current main spacer and the auxiliary spacer along the vertical direction are usually trapezoidal, and the rub alignment anomaly area formed by them is of a comet tail shape similar to the projections of their section areas, namely, the width of the rub alignment shadow in a region closest to the first spacer 51 is the largest, and its width in a region away from the first spacer 51 decreases gradually, and yet the first light shielding pattern 61 is disposed outside the black matrix 30 and will occupy an extra effective display area, in order to reduce affection on the aperture ratio of the display panel 01 as much as possible, as shown in (a) of FIG. 7, the first light shielding pattern 61 has a first width along the direction perpendicular to the rub alignment direction, and the first width of at least a part of the area of the first light shielding pattern 61 decreases along a direction away from the first spacer 51.

Here, (a) of FIG. 7 is only illustrated taking that the rub alignment direction is vertical and the first width of all the area of the first light shielding pattern 61 along a direction away from the first spacer 51 decreases gradually as an example. The embodiments of the disclosure are not limited to this. In a case where the rub alignment direction is vertical, the beneficial effect of reducing the affection on the aperture ratio may be achieved as long as the first width of part of the area of the first light shielding pattern 61 along a direction away from the first spacer 51 decreases gradually.

Moreover, with reference to (a) of FIG. 4, when the first spacer 51 is located at the intersection of a horizontal portion and a vertical portion of the black matrix 30 and the rub alignment direction is tilted, the first light shielding pattern 61 along a direction away from the first spacer 51 may take on a setting mode in which it increases first and then decreases, which may equally achieve the beneficial effect of reducing the affection on the aperture ratio.

Likewise, as shown in (b) of FIG. 7, the second light shielding pattern 62 has a second width along the direction perpendicular to the rub alignment direction, and the second width of at least a part of the area of the second light shielding pattern 62 decreases along a direction away from the second spacer 52, namely, at least a part of the area of the second light shielding pattern 62 has a gradually changing shape.

Here, (b) of FIG. 7 is only illustrated taking that the rub alignment direction is vertical and the second width of all the area of the second light shielding pattern 62 along a direction away from the second spacer 52 decreases gradually as an example. The embodiments of the disclosure are not limited to this. In a case where the rub alignment direction is vertical, the beneficial effect of reducing the affection on the aperture ratio may be achieved as long as the second width of part of the area of the second light shielding pattern 62 along a direction away from the second spacer 52 decreases gradually.

Moreover, with reference to (a) of FIG. 6, when the second spacer 52 is located at the intersection of a horizontal portion and a vertical portion of the black matrix 30 and the rub alignment direction is tilted, the second light shielding pattern 62 along a direction away from the second spacer 52 may take on a setting mode in which it increases first and then decreases, which may equally achieve the beneficial effect of reducing the affection on the aperture ratio.

Based on the above description, when the first spacer 51 produces a displacement due to the process deviation, in order to cause the first light shielding pattern 61 to be able to sufficiently shield the rub alignment shadow after the first spacer 51 produces a displacement, the first width of the first light shielding pattern 61 along the direction perpendicular to the rub alignment direction is greater than and alternatively equal to the width of the first spacer 51 along the rub alignment direction.

Moreover, the above design of the first light shielding pattern 61 may further be better applied in a case where the section figure of the first spacer 51 along the direction perpendicular to the display panel 01 is other non-rectangle such as an hourglass type, etc., to sufficiently shield the orientation anomaly area on the alignment layer.

Likewise, in order to cause the second light shielding pattern 62 to be able to sufficiently shield the rub alignment shadow after the second spacer 52 produces a displacement, the second width of the second light shielding pattern 62 along the direction perpendicular to the rub alignment direction is greater than and alternatively equal to the width of the second spacer 52 along the rub alignment direction. Such a design may equally be better applied in a case where the section figure of the second spacer 52 along the direction perpendicular to the display panel 01 is other non-rectangle such as an hourglass type, etc., to sufficiently shield the orientation anomaly area on the alignment layer.

In the following, three specific embodiments will be provided for describing the above display panel 01 provided by the embodiments of the disclosure in detail.

Specific Embodiment One

With reference to FIG. 4, the first light shielding pattern 61 is constituted by a first black matrix pattern disposed on the same layer as the black matrix 30 to simplify the production process.

Here, "disposed on the same layer" involves at least two patterns, and refers to a structure in which the at least two patterns are disposed on the same substrate layer. Generally, the at least two patterns are formed on a layer of thin film made from the same material by the same patterning process.

The first black matrix pattern (i.e., the first light shielding pattern 61) may and alternatively may not contact the black matrix. Consider that when the first black matrix pattern (i.e., the first light shielding pattern 61) does not contact the black matrix, there is no area for shielding light at a gap between them, such that the rub alignment shadow of the first spacer 51 may not be shielded completely. Therefore, optionally, with reference to FIG. 4, the first black matrix pattern (i.e., the first light shielding pattern 61) is an extension of the first black matrix area.

Further, when the display panel 01 further comprises a second spacer 52 as an auxiliary spacer, with reference to FIG. 6, the second light shielding pattern 62 is constituted by a second black matrix pattern disposed on the same layer as the black matrix 30 to simplify the production process.

Likewise, in order to more sufficiently shield the rub alignment shadow of the second spacer 52, optionally, the second black matrix pattern (i.e., the second light shielding pattern 62) is an extension of the second black matrix area.

Specific Embodiment Two

Figure 8:
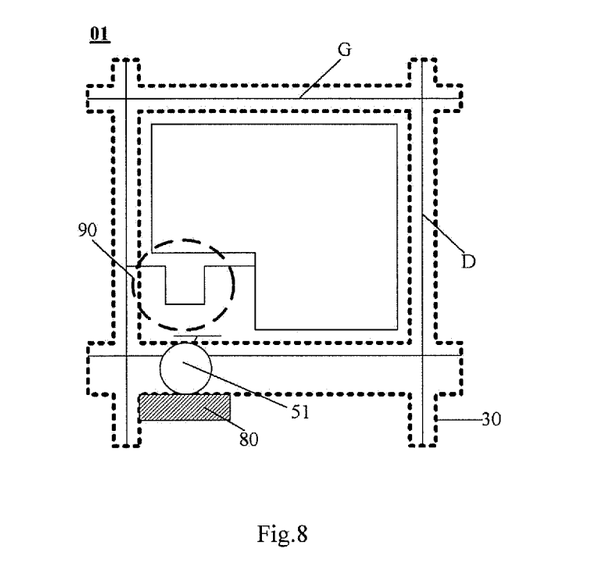
FIG. 8 is a fourth partial schematic structural top view of a display panel provided by an embodiment of the disclosure.

The black matrix 30 is disposed on the first base-plate 10, and as shown in FIG. 8, the first light shielding pattern is constituted by a metal pattern 80 disposed on the second base-plate 20 (which is not schematically shown in the figure).

Here, the first base-plate 10 may be a color film base-plate and alternatively a BM base-plate, and accordingly, the second base-plate 20 may be an array base-plate and alternatively a COA base-plate. The black matrix 30 on the first base-plate 10 usually corresponds to the areas of the TFT 90, the gate line G and the data line D on the second base-plate 20. In FIG. 8, the location of the black matrix 30 is schematically shown by a dashed box.

The metal pattern 80 may be a storage pad (PAD) and alternatively a metal wiring, etc. on the second base-plate 20 which is not covered by the black matrix.

Figure 9:
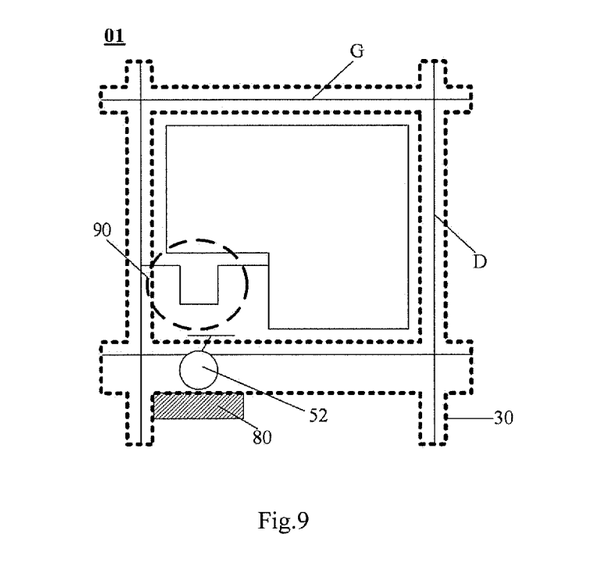
FIG. 9 is a fifth partial schematic structural top view of a display panel provided by an embodiment of the disclosure.

Further, when the display panel 01 further comprises a second spacer 52 as an auxiliary spacer, as shown in FIG. 9, the second light shielding pattern is constituted by a metal pattern 80 disposed on the second base-plate 20.

Here, the metal pattern 80 may be a storage pad (PAD) and alternatively a metal wiring, etc. on the second base-plate 20 which is not covered by the black matrix.

It needs to be noted that, the metal pattern 80 constituting the first light shielding pattern and the metal pattern 80 constituting the second light shielding pattern may be different structures in the second base-plate 20, and alternatively also may be the same structure disposed at this location (e.g., patterns of the same metal wiring in different areas, etc.).

In particular, utilization of the metal layer on the second base-plate 20 for light shielding does not easily produce a new segment gap, avoiding that the regularity of rub orientation is affected when the rub orientation is conducted on the alignment layer of the second base-plate 20 due to many film layer segment gaps below.

Specific Embodiment Three

Figure 10:
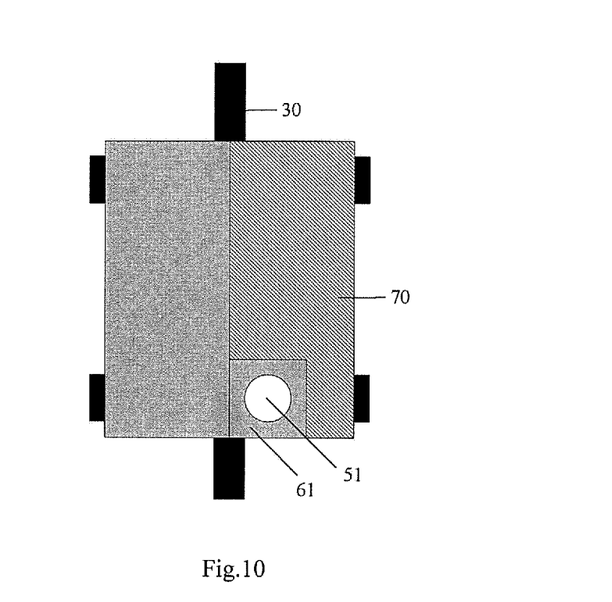
FIG. 10 is a sixth partial schematic structural top view of a display panel provided by an embodiment of the disclosure.

As shown in FIG. 10, the first base-plate 10 and alternatively the second base-plate 20 further comprises a plurality of color filter units arranged in an array, and a filter layer 70 is disposed in each of the color filter units, the first light shielding pattern 61 is formed by superposing two neighboring filter layers 70, the area where two neighboring filter layers 70 are superposed is utilized to achieve light shielding and the production process is simplified.

Figure 11:
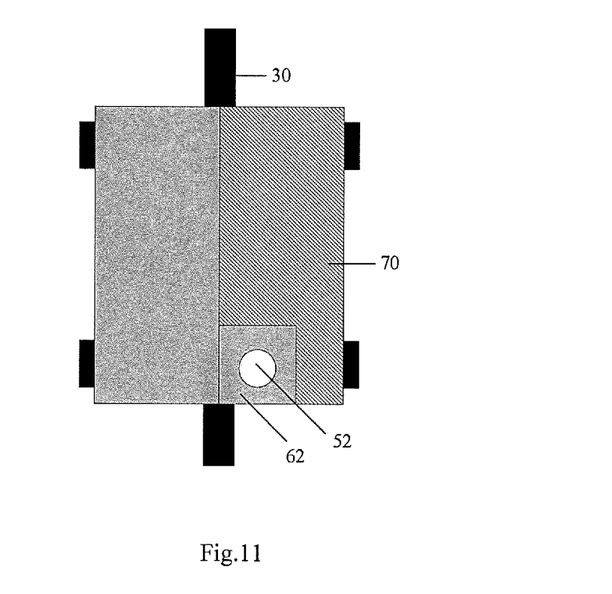
FIG. 11 is a seventh partial schematic structural top view of a display panel provided by an embodiment of the disclosure.

Further, when the display panel 01 further comprises a second spacer 52 as an auxiliary spacer, as shown in FIG. 11, the second light shielding pattern 62 is also formed by superposing two neighboring filter layers, and the production process is further simplified.

Further, an embodiment of the disclosure further provides a display device comprising a display panel 01 as described above.

Here, the display device may be specifically any product and alternatively component with the display function, such as a liquid crystal display, a liquid crystal television, a digital photo frame, a mobile phone, a tablet computer, etc.

What are described above are just specific embodiments of the disclosure, however, the protection scope of the invention is not limited thereto, and variations or alternatives easily occurring to any artisan familiar with the technical field within the technical scope disclosed by the invention should be encompassed within the protection scope of the invention. Therefore, the protection scope of the invention should be subject to the protection scope of the claims.

The invention claimed is:

1. A display panel comprising: a first base-plate and a second base-plate which are oppositely disposed, wherein the first base-plate comprises a black matrix and a first spacer, the black matrix having a first black matrix area corresponding to the first spacer, wherein the first base-plate or the second base-plate further comprises a first light shielding pattern, and the projection of at least a part of the first light shielding pattern on the first base-plate is located on at least one of two sides of the projection of the first black matrix area on the first base-plate along a rub alignment direction, wherein the projection of at least a part of the first light shielding pattern on the first base-plate has a first width along the direction perpendicular to the rub alignment direction, and the first width decreases gradually along a direction on the first base plate away from the first spacer.

2. The display panel as claimed in claim 1, wherein the first base-plate further comprises a second spacer, the height from the bottom surface of the first spacer away from the first base-plate to a substrate base-plate of the first base-plate is greater than the height from the bottom surface of the second spacer away from the first base-plate to the substrate base-plate of the first base-plate, the black matrix further has a second black matrix area corresponding to the second spacer, the first base-plate or the second base-plate further comprises a second light shielding pattern, and the projection of the second light shielding pattern on the first base-plate is located on at least one of two sides of the projection of the second black matrix area on the first base-plate along the rub alignment direction.

3. The display panel as claimed in claim 2, wherein the first black matrix area and the first light shielding pattern on two sides of it along the rub alignment direction constitute a first light shielding area, the second black matrix area and the second light shielding pattern on two sides of it along the rub alignment direction constitute a second light shielding area, and along the rub alignment direction, the length of the projection of the first light shielding area on the first base-plate is greater than that of the projection of the second light shielding area on the first base-plate, or, the first black matrix area and the first light shielding pattern on one of two sides of it along the rub alignment direction constitute a first light shielding area, the second black matrix area and the second light shielding pattern on one of two sides of it along the rub alignment direction constitute a second light shielding area, and along the rub alignment direction, the length of the projection of the first light shielding area on the first base-plate is greater than that of the projection of the second light shielding area on the first base-plate.

4. The display panel as claimed in claim 2, wherein the second light shielding pattern has a second width along the direction perpendicular to the rub alignment direction, and the second width of at least a part of the area of the second light shielding pattern decreases along a direction away from the second spacer.

5. The display panel as claimed in claim 2, wherein the second light shielding pattern has a second width along the direction perpendicular to the rub alignment direction, and the second width is greater than or equal to the width of the second spacer along the rub alignment direction.

6. The display panel as claimed in claim 2, wherein the second light shielding pattern is constituted by a second black matrix pattern disposed on the same layer as the black matrix.

7. The display panel as claimed in claim 6, wherein the second black matrix pattern is an extension of the second black matrix area.

8. The display panel as claimed in claim 2, wherein the second light shielding pattern is constituted by a metal pattern disposed on the second base-plate.

9. The display panel as claimed in claim 2, wherein the first base-plate further comprises a plurality of color filter units arranged in an array, and a filter layer is disposed in each of the color filter units, and
the second light shielding pattern is formed by superposing two neighboring said filter layers.

10. The display panel as claimed in claim 2, wherein the first base-plate further comprises a cushion layer,
the first spacer is disposed above the cushion layer, and the height of the body of the first spacer is identical to that of the body of the second spacer.

11. The display panel as claimed in claim 1, wherein the first light shielding pattern has a first width along the direction perpendicular to the rub alignment direction, and the width is greater than or equal to the width of the first spacer along the rub alignment direction.

12. The display panel as claimed in claim 1, wherein the first light shielding pattern is constituted by a first black matrix pattern disposed on the same layer as the black matrix.

13. The display panel as claimed in claim 12, wherein the first black matrix pattern is an extension of the first black matrix area.

14. The display panel as claimed in claim 1, wherein the first light shielding pattern is constituted by a metal pattern disposed on the second base-plate.

15. The display panel as claimed in claim 1, wherein the first base-plate further comprises a plurality of color filter units arranged in an array, and a filter layer is disposed in each of the color filter units, and
the first light shielding pattern is formed by superposing two neighboring said filter layers.

16. A display device, wherein the display device comprises a display panel as claimed in claim 1.

17. A display panel comprising: a first base-plate and a second base-plate which are oppositely disposed, wherein the first base-plate comprises a black matrix and a first spacer, and a second spacer next to it, the black matrix having a first black matrix area corresponding to the first spacer and a second black matrix area corresponding to the second spacer, wherein
the first base-plate or the second base-plate further comprises a first light shielding pattern and a second light shielding pattern, and the projection of at least a part of the first light shielding pattern on the first base-plate is located on at least one of two sides of the projection of the first black matrix area on the first base-plate along a rub alignment direction, the projection of at least a part of the second light shielding pattern on the first base-plate is located on at least one of two sides of the projection of the second black matrix area on the first base-plate,
wherein the projections of the first light shielding pattern and the second light shielding pattern on the first base-plate are separate,
wherein the projection of at least a part of the first light shielding pattern on the first base-plate has a first width along the direction perpendicular to the rub alignment direction, and the first width decreases gradually along a direction on the first base plate away from the first spacer.

18. The display panel of claim 17, wherein the height from the bottom surface of the first spacer away from the first base-plate to a substrate base-plate of the first base-plate is greater than the height from the bottom surface of the second spacer away from the first base-plate to the substrate base-plate of the first base-plate, and
along a direction, the length of the projection of the first light shielding area on the first base-plate is greater than that of the projection of the second light shielding area on the first base-plate.

19. A display panel comprising: a first base-plate and a second base-plate which are oppositely disposed, wherein the first base-plate comprises a black matrix and a first spacer, the black matrix having a first black matrix area corresponding to the first spacer,
wherein
the first base-plate or the second base-plate further comprises a first light shielding pattern, and the projection of the first light shielding pattern on the first base-plate exceeds the projection of the first black matrix area on the first base-plate, and the width of exceeding part along a direction perpendicular to the data line is smaller than a distance between two adjacent data lines,
wherein the projection of at least a part of the first light shielding pattern on the first base-plate is located on at least one of two sides of the projection of the first black matrix area on the first base-plate along a rub alignment direction, wherein the projection of at least a part of the first light shielding pattern on the first base-plate has a first width along the direction perpendicular to the rub alignment direction, and the first width decreases gradually along a direction on the first base plate away from the first spacer.

* * * * *